United States Patent [19]

Das

[11] Patent Number: 5,137,989
[45] Date of Patent: Aug. 11, 1992

[54] PROCESS FOR MAKING CYANATO CONTAINING PHENOLIC RESINS

[75] Inventor: Sajal Das, Basking Ridge, N.J.

[73] Assignee: Allied-Signal Inc., Morristown, N.J.

[21] Appl. No.: 402,170

[22] Filed: Sep. 1, 1989

[51] Int. Cl.$^5$ ............................................. C08G 65/48
[52] U.S. Cl. ................................... 525/504; 525/390; 525/480
[58] Field of Search ....................... 525/504, 480, 390

[56] References Cited

U.S. PATENT DOCUMENTS

| | | | |
|---|---|---|---|
| 3,444,137 | 5/1969 | Higginbottom et al. | 260/51.5 |
| 3,448,079 | 6/1969 | Grigat et al. | 260/59 |
| 3,966,670 | 6/1976 | Grazen et al. | 260/34 |
| 4,022,755 | 5/1977 | Tanigaichi et al. | 260/59 |
| 4,069,108 | 1/1978 | Riecker | 202/263 |
| 4,218,361 | 8/1980 | Searfoss et al. | 260/38 |
| 4,219,452 | 8/1980 | Littlefield | 260/3 |
| 4,268,157 | 5/1981 | Ebi et al. | 355/3 |
| 4,268,657 | 5/1981 | Manzara | 528/155 |
| 4,650,838 | 5/1987 | Das et al. | 525/504 |
| 4,650,839 | 5/1987 | Das et al. | 525/504 |
| 4,713,422 | 12/1987 | Woo et al. | 528/422 |
| 4,757,118 | 7/1988 | Das et al. | 525/504 |
| 4,771,113 | 9/1988 | Das et al. | 525/508 |
| 4,806,625 | 2/1989 | Bogan et al. . | |
| 4,831,086 | 5/1989 | Das et al. | 525/504 |
| 4,851,279 | 7/1989 | Das et al. . | |

FOREIGN PATENT DOCUMENTS

| | | |
|---|---|---|
| 0147548 | 7/1985 | European Pat. Off. . |
| 58-034822 | 3/1983 | Japan . |
| 59-149918 | 8/1984 | Japan . |
| 63-5443 | 7/1988 | Japan . |
| 8503713 | 8/1985 | World Int. Prop. O. . |

OTHER PUBLICATIONS

Patent Abstracts of Japan, vol. 8, No. 279 (C-257), Dec. 20, 1984 (1716).
Patent Abstracts of Japan, vol. 7, No. 114 (C-166) May 18, 1983, (1259).
C. B. Delano et al., Synthesis of Improved Phenolic Resins, NTIS Acurex Corporation/Aerotherm, pp. vii–107, Sep. 1979.
J. P. Critchley et al., Heat-Resistant Polymers, Technologically Useful Materials, pp. 406–408, 1986.

Primary Examiner—Harold D. Anderson
Attorney, Agent, or Firm—R. C. Stewart, II; G. H. Fuchs; D. L. Webster

[57] ABSTRACT

The present invention is directed to a process of preparing a cyanato group containing phenolic resin by reacting the corresponding phenolic resin with a tertiary amine in a water immiscible, non-hydrogen bonding solvent at a temperature of preferably less than about 25° C. to form the corresponding ammonium salt of the phenolic resin; and reacting the ammonium salt with a cyanogen halide at a temperature equal to or less than about 0° C. in said solvent to form the cyanato containing phenolic resin.

28 Claims, No Drawings

PROCESS FOR MAKING CYANATO CONTAINING PHENOLIC RESINS

BACKGROUND OF THE INVENTION

1. Field of the Invention

This invention relates to a process for preparing cyanato group containing phenolic resins. More particularly, this invention relates to a process of preparing such resins which have improved properties.

2. Prior Art

Phenolic resins are a class of synthetic materials that have grown continuously in terms of volume and applications for over several decades. The building blocks used in greatest volume are phenol and formaldehyde. Other important phenolic starting materials are the alkyl-substituted phenols, including cresols, xylenols, p-tert-butyl-phenol, p-phenylphenol, and nonylphenol. Diphenols, e.g., resorcinol (1,3-benzenediol) and bisphenol-A [bis-A or 2,2-bis(4-hydroxylphenyl)propane], are employed in smaller quantities for applications requiring special properties. In addition to formaldehyde, acetyldehyde or furfuraldehyde sometimes are employed but in much smaller quantities. The greater latitude in molecular structure, which is provided by varying the raw materials, chemistry, and manufacturing process, has made possible an extremely large number of applications for these products as a result of the array of physical properties that arise from the synthetic options.

The early investigation of the reaction of phenol and formaldehyde began with the work of von Baeyer and others in the early 1870's as an extension of phenol based dye chemistry. The initial experiments result in soluble, amorphous products whose properties elicited little interest. Insoluble, cross-linked products also were reported in the late 1880's, but these products also were not perceived as useful materials. In 1888, the first patent for a phenolic-resin product intended for use as a hard-rubber substitute was granted. The first commercial product was introduced as a shellac substitute by the Louis Bluner Company in the early 1900's. Process patents were issued in 1894 and 1895 for ortho- and para-methylolphenol, respectively.

Key innovations in early phenolic-resin manufacture included control of the molecular structure and the use of heat and pressure to achieve desirable physical properties in filled compositions. Studies in the use of acidic or basic catalysts and of changes in the molar ratio of formaldehyde to phenol resulted in the definition of two classes of polymeric materials which are referred to as Bakelite resins. Caustic-catalyzed products, which are prepared with greater than a 1:1 mol ratio of formaldehyde to phenol, can be used to form cross-linked, insoluble, and infusible compositions in a controlled fashion. With less than a 1:1 mol ratio of formaldehyde to phenol, the resultant products remain soluble; furthermore, acid catalysis yields permanently stable compositions, whereas base-catalyzed materials can be advanced in molecular weight and viscosity. Possibly of greatest importance to early commercialization, however, was the reduction to practice of the use of heat and pressure to produce essentially void-free molding compositions.

Resole resins are made with an alkaline catalyst and a molar excess of formaldehyde. Novolak or novolac resins are prepared with an acid catalyst and less than one mol of formaldehyde per mol of phenol. The initial reaction involved in the preparation of resolated novolacs is carried out with an acid catalyst and less than a 1:1 mol ratio of formaldehyde to phenol. After formation of the novolac, the pH is adjusted so that the reaction mixture is basic and additional formaldehyde is added. Resoles and resolated novolaks are inherently thermosetting and require no curing agent for advancement. Novolacs, by comparison, are thermoplastic and require the addition of a curing agent, the most common being either hexamethylene-tetramine or a resole. The stages of molecular weight advancement are characterized by liquid or solid phenolic polymer which is soluble in certain organic solvents and is fusible; solid resin which is insoluble but swelled by organic solvents and, although softened by heat, exhibits essentially no flow; and an insoluble, infusible product which is not swelled by solvents nor softened by heat, i.e., the system is in a highly cross-linked state.

Phenolic resins have many uses. For example, such materials are used as bonding agents in friction materials such as brake linings, clutch facings, transmission bonds and the like. For example, U.S. Pat. Nos. 4,268,157; 4,069,108; 4,268,657; 4,218,361; 4,219,452; and 3,966,670 describe various friction materials in which a phenolic resin is employed as the bonding agent. Phenolics are also used as molding materials, and as coatings and adhesives. Phenolic resins developed for non-flammability and long-term temperature stability to 230° C. have been studied in carbon-fiber composites. Potential for such composites lies in advanced aircraft application.

While present day phenolics exhibit several beneficial properties, they suffer from a number of disadvantages which restrict their utility. For example, such materials exhibit less than desirable thermal oxidative stability. Other major problems of present day phenolic technology include a need for auxiliary chemicals such as hexamethylene-tetramine to crosslink the phenolic which often results in the production of volatile by-products such as ammonia during crosslinking is often extensive and is not controllable.

Various modifications to phenolics have been proposed to obviate certain of the disadvantages attendant to these resins. For example, epichlorohydrin has been reacted with the hydroxyl groups of novolak forming epoxy novolak. Moreover, n-chloro-2-propene has been reacted with the hydroxyl groups of novolac to form the corresponding form methylon resin. Illustrative of other modified phenolics are those described in U.S. Pat. Nos. 4,650,838; 4,650,839; 4,757,118; and 4,771,113 to Das et al.

Japanese Patent Publications Nos. 59-149918, and 58-34822 describe a method of preparing a phenolic resin containing cyanate groups. In this method, a trialkyl ammonium salt of a phenol novolak is reacted with excess cyano halogen in an organic solvent such as methylene chloride. The ammonium by-product salt is separated from the reaction mixture by extraction with water. Several disadvantages are attendant to the process of these references. For example, the process is suitable only for cyanation of low molecular weight novolac resin below 450 Mn. The method disclosed in these references results in a phenolic cyanate resin which release smoke (volatiles) during curing at 155° C. or above.

U.S. Pat. No. 3,448,079 describes aromatic cyanic acid esters produced by the reaction of phenolic resins with cyanogen halide in which the hydroxyl groups of the phenol-formaldehyde resins are replaced with cyanic acid ester groups, and process for producing same. U.S. Pat. No. 3,444,137 describes curable phenol-aldehyde resins characterized by molecules which contain a cyano group, an amine nitrogen atom, a phenyl group and a substituted hydroxyl group, such molecules having been made by reacting a phenol, formaldehyde and a cyano substituted primary or secondary amine. U.S. Pat. No. 4,022,755 describes cyanato-group containing phenol resins, and a process for preparing same. U.S. Pat. No. 4,713,442 discloses a polytriazine which comprises 1, 3, 5-triaryloxytriazines. Polyaromatic cyanates are also disclosed in EPA 0147548, WO85/03713 and GB-A-1218447.

Cyanato group containing phenolic resins have been described in Delano et al., *Synthesis of Improved Phenolic Resins*, Acurex Corp/Aerotherm, Acurex Vinyl Report 79-25/AS, Sep. 4, 1979 prepared for NASA Lewis Research Center, Contract No. Nas3-21368, and is available through the United States Department of Commerce National Technical Information Service.

A recent reference, *Heat Resistance Polymers* by Critchley et al., pp. 406–408, Plenum Press, New York, 1986, has described phenolic triazine resins prepared from phenolic novolac or meta-cresol novolac which have essentially the same chemical structures as described in the above referenced patents.

The phenolic-triazines which have been disclosed have been found to have high thermal stability. However, they have not been commercially produced because of poor shelf life, and a gel time too short for processing using conventional plastic processing equipment. It has been found as illustrated below, that reproduction of the phenolic cyanate ester resins disclosed in the art are unstable and not suitable for commercial applications such as matrix for various composites, impregnation media for paper and nonwovens, adhesives, coatings, molding compositions and the like. When these unstable resins are converted into a crosslinked product (phenolic-triazines) mechanical properties have been observed to be poor. The cured resins are so brittle, that frequently a suitable test sample for property determination cannot be fabricated. It has been found that curing the phenolic cyanate ester resins prepared according to the disclosures in the art, generates smoke and volatile chemicals.

U.S. Pat. No. 4,831,086 disclose a new class of phenolic cyanates and phenolic-triazine resins. The phenolic cyanate resins are disclosed to be stable as measured by gel time. The phenolic triazine resins are disclosed to be thermally stable as measured by Thermal Gravimetric Analysis. U.S. Pat. No. 4,831,086 also discloses an improved method for making cyanato-containing phenolic resins. In this method the cyanato-containing phenolic resin is formed by reacting an uncyanated phenolic resin, referred to as "phenolic resin", such as novolac resin, and a base, preferably trialkylamine in a cyclic ether solvent to form the corresponding trialkylammonium salt of novolac at room temperature. The trialkylammonium salt is then reacted with a cyanogen halide in the cyclic ether solvent to form the cyanato-containing phenolic resin. It is particularly preferred to conduct the reaction at a temperature below about −5° C. and preferably from −5° C. to −45° C., more preferably −5° C. to −30° C., and most preferably −15° C. to −30° C. The reaction product is purified at a temperature of from 0° C. to −45° C. preferably by precipitation in a nonsolvent such as an alcohol, preferably isopropanol.

SUMMARY OF THE INVENTION

This invention is directed to a process for preparing a cyanato-containing phenolic resin of the Formula I:

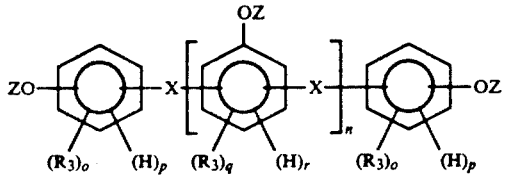

FORMULA I which comprises the steps of (a) reacting a tertiary amine with a phenolic resin of the Formula II:

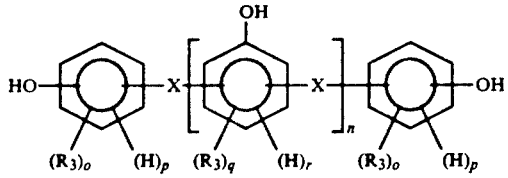

FORMULA II in a reaction medium comprising one or more a water immiscible, non-hydrogen bonding solvents to form the ammonium salt of said phenolic resin; and (b) reacting said ammonium salt with a cyanogen halide in said water immiscible, non-hydrogen bonding solvents at a temperature equal to or less than about 0° C. to form said cyanato-containing phenolic resin;

wherein:

n is a positive whole number greater than or equal to 1;

q and r are the same or different at each occurrence and are whole numbers from 0 to 3, with the proviso that the sum of q and r at each occurrence is equal to 3;

Z is —CN, or hydrogen and —CN;

o and p are the same or different at each occurrence and are whole numbers from 0 to 4 with the proviso that the sum of o and p at each occurrence is equal to 4;

—X— is a divalent organic radical; and $R_3$ is the same or different at each occurrence and is a substituent other than hydrogen which is unreactive under conditions necessary to completely cure the copolymer.

The cyanato group containing phenolic resins formed in accordance with the process of this invention exhibit several beneficial properties. For example, the resin prepared by the method of this invention is processible using conventional plastic processing equipment and has a long shelf life. Furthermore, these phenolics include substantially no volatiles and generate substantially no smoke during gel time measurement. Phenolic-triazine resins formed by cyclotrimerization of the cyanato-containing phenolic resin formed by the process of this invention exhibited excellent char yield, fire resistance and thermal properties.

DETAILED DESCRIPTION OF THE INVENTION

In the first step of the process of this invention, a phenolic resin of the formula:

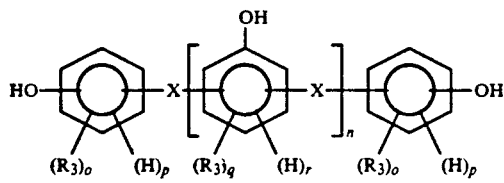

is reacted with a tertiary amine in a water immiscible, non-hydrogen bonding solvent to form the trialkyl ammonium salt of the phenolic resin.

As used herein a "water immiscible, non-hydrogen bonding solvent" is a solvent which non-polar, and non-hydrogen bonding which has a solubility parameter equal to or greater than about 9.0. Such solvents are well known in the art. See for example, Robert C. West, "CRC Handbook of Chemistry and Physics", 50th Ed., CRC Press, Cleveland, Ohio (1977). Illustrative of such solvents are aliphatic nitriles as for example acetonitrile, propionitrile, acrylonitrile, butyronitrile, valeronitrile, and the like; nitro substituted aromatic and aliphatic compounds such as nitrobenzenes, nitroethane, nitromethane, 1-nitropropane, 2-nitropropane and the like; halo substituted aromatic and aliphatic compounds such as chlorobenzene, 1,2-dichlorobenzene, chloroform, bromoethane, chloroethane, penta-chloroethane, 1,1,2,2-tetrachloroethane, 1,1,2-trichloroethane, bromomethane, dichloromethane, and the like; and various sulfides and disulfides such as carbon disulfide and dimethyl sulfide; and mixtures thereof. Preferred solvents for use in the first step of the process of this invention are aliphatic nitriles, nitro-substituted aromatic and aliphatic compounds and halo-substituted aromatic and aliphatic compounds having a solubility parameter equal to or greater than about 9.0; and particularly preferred solvents are chloro or bromo substituted aliphatic and aromatic compounds having a solubility parameter equal to or greater than about 9.0. Most preferred solvents for use in the practice of this invention are bromo and chloro-substituted aliphatic compounds such as methylene chloride having a solubility parameter equal to or greater than about 9.0.

The amount of solvent employed may vary widely, the only requirement is that the amount is sufficient to solvate the desired amount of phenolic resin. The amount of phenolic resin in solution will depend on the molecular weight of the phenolic resin. In general, the lower the molecular weight, the higher the permissible solid content of the solution, and the higher the molecular weight the lower the permissible solids content. In general, the amount of solvent is such that the amount of phenolic resin in solution is at least about 50% by weight based on total weight of the solution. In the preferred embodiments of the invention the amount of solvent is such that the amount of phenolic resin in solution is at least about 25% by weight based on the total weight of the solution, and in the particularly preferred embodiments of this invention the amount of solvent is such that the amount of phenolic resin in solution is from at least about 20% by weight on the aforementioned basis. In the most preferred embodiments of the invention the amount of solvent is such that the amount of phenolic resin in solution is from about 10 to about 20% by weight based on the total weight of the solution.

The types of phenolic resin used in step 1 of the process of this invention may vary widely and are those of the Formula II. In the preferred embodiments of the invention, the phenolic resins for use in the process of this invention preferably contains less than about 5% of free phenol by weight based on the total weight of the resin free phenol. Free phenol contained in the phenolic resin can react with cyanogen halide in the second step of the process to form phenol cyanate. This is not desirable because phenol cyanate is a volatile material which contributes to the formation of smoke, and volatiles during curing of the resin. In the preferred embodiments of the invention the phenolic resin contains less than about 2% by weight of free phenol based on the total weight of the resin, and in the most preferred embodiments of the invention, the amount of free phenol in the resin is less than about 1% by weight based on the total weight of the resin. The amount of free phenol in the phenolic resin of choice is less than about 0.5% by weight based on the total weight of the resin.

The molecular weight of the phenolic resin may vary widely. The preferred molecular weight of the phenolic resin for use in the process of this invention is a number average molecular weight in the range of from about 300 to about 1700, more preferably from about 500 to about 1500 and most preferably from about 700 to about 1000. The molecular weight distribution and number average molecular weight of the phenolic resin can be determined by gel permeation chromatography (GPC) using tetrahydrofuran as a solvent.

In the structure of Formula II, $R_3$ is an inert substituent. Illustrative of suitable $R_3$ groups are such inert substituents as halogen, trihalomethyl, alkyl, alkoxy, phenyl and the like.

Illustrative of suitable —X— groups are alkylene such as methylene, ethylmethylene, 2-ethylpentylmethylene, methylmethylene, isopropylmethylene, isobutylmethylene, pentylmethylene, and furylmethylene, and the like; arylenes such as 1,3-benzenedimethylene, phenylmethylene, 1,4-benzenedimethylene, 2,2-bis-(4-phenylene)propane, 4-methoxyphenylmethylene, bis-(4-phenylene)methane, 4,4-diphenylene dimethylethane; and the cycloalkylenes such as cyclohexylene, cyclooctylene, and the 1,3-cyclohexanedimethylene, and the like.

Preferred phenolic resins for use in the practice of this invention are those embodiments of the Formula II in which:

—X— is —O—, —S—, —SO$_2$—, —C(O)—, —OC(O)—, —C(O)O— substituted or unsubstituted methylene or 1,4-phenyldimethylene wherein permissible substituents are halogen, alkyl or furyl;

q and r are the and are positive whole numbers from 0 to 3, with the proviso that the sum of q and r is 3;

$R_3$ is alkyl;

n is a positive number from 1 to about 20; and o and p are the same or different at each occurrence and are positive whole numbers from 0 to 4, with the proviso that the sum of o and p is 4.

Among the preferred embodiments, particularly preferred phenolic resins are those of above Formula II in which:

—X— is —O—, —S—, —SO$_2$—, —C(O)—, —OC(O)—, —C(O)O— methylene, methylene substituted with alkyl having from about 1 to about 10 carbon atoms, halogen or furfuryl, or 1,4-phenylene dimethylene;
R$_3$ is methyl or ethyl;
o is 0 or 1;
p is 0 or 1;
n is 1 to about 12;
q is 0 or 1;
r is 1 to 3; and
p is 1 to 4.

Most preferred embodiments phenolic resins, are those of the Formula II in which:
n is 1 to about 8;
q is 0;
o is 0; and
X is a moiety of the formula:

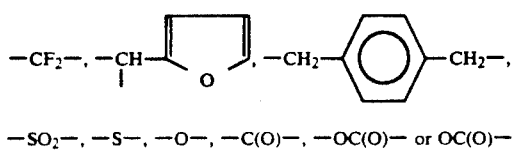

$-SO_2-$, $-S-$, $-O-$, $-C(O)-$, $-OC(O)-$ or $OC(O)-$ r is 3; and
p is 4, with those phenolic resins in which X is

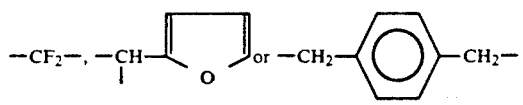

being the phenolic resin of choice.

In step 1, process temperatures may vary widely, but should be and reactants below the boiling point of the solvent reactants, and above the freezing point of the solvent and at the temperature. Temperatures can vary from as high as 25° C. or higher to as low as −45° C. or lower depending primarily on the freezing point of the solvent. In the preferred embodiments of the invention, temperatures are from about 25° C. to about −45° C., and in the particularly preferred embodiments of the invention are from about 0° C. to about −30° C. In the most preferred embodiments of the invention, step 1 is carried out at a temperature of from about −5° C. to about −20° C. primarily because this is the critical temperature range of step 2 of the process and carrying out step 1 at this temperature would obviate the need for cooling the reaction product of step 1 prior to use in step 2.

Process pressures are not critical. The reaction can be carried out at sub-atmospheric, atmospheric or super-atmospheric pressures.

Any type of tertiary amine can be used in the process of this invention. Illustrative of useful tertiary amines are trimethylamine, triethylamine, tripropylamine, N,N-dimethyl aniline, N-methyl piperidene, dimethyl-sec-butylamine, n-methylpyrrolidine, pyridine and the like. Preferred tertiary amines are trialkylamines and the most preferred trialkylamine is triethylamine.

The amount of tertiary amine reacted with the phenolic resin is an amount sufficient to form the desired ammonium salt. In general, the amount of amine reactant is at least equivalent to or substantially equivalent to the amount of the phenolic resin or an excess of the amine react is used. An equivalent amount of the amine is an amount which is sufficient to react with all or substantially all of the hydroxy substituents of the phenolic resin. The upper limit to the amount of amine reactant is not critical and is dependent primarily on economic factors and the difficulty of removing excess amine during purification of the reaction product. In the preferred embodiments of the invention, an amount of amine is such that the ratio of equivalents of phenolic resin to equivalents of tertiary amine is from about 1:1 to about 1:1.5 and in the particularly preferred embodiments of the invention the ratio is from about 1:1 to about 1:1.2. Amongst these particularly preferred embodiments, most preferred are those embodiments of the invention in which the amount of amine is such that the ratio of equivalents of phenolic resin to equivalents of tertiary amine is from about 1:1.02 to about 1:1.07, with an equivalent ratio of about 1:1.05 being the equivalent ratio of choice.

In the second step of the process of this invention, the ammonium salt of the phenolic resin is reacted with a cyanogen halide in a water immiscible, non-hydrogen bonding solvent at an effective temperature to form the cyanato group containing phenolic resin of the Formula I. The ammonium salt of the phenolic resin can be reacted in situ with the cyanogen halide, or can be isolated from the reaction mixture by conventional product isolating means and purified for use in the second step of the process of the invention. In the preferred embodiments of the invention, the ammonium salt of the phenolic resin and the cyanogen halide are reacted in situ.

The relative amounts of the reactants may vary widely, and will generally depend on the degree of cyanation desired. In general, the higher the desired degree of cyanation, the higher the equivalent ratio of cyanogen halide to ammonium salt of the phenolic resin; and the lower the desired degree of cyanation, the lower the equivalent ratio of the halide to the salt. In the preferred embodiments of the invention, the equivalent ratio of the ammonium salt of the resin to the cyanogen halide is from about 1:1 to about 1:1.25 and in the particularly preferred embodiments of the invention is from about 1:10 to about 1:25. In the most preferred embodiments of the invention, the equivalent ratio of the ammonium salt of the phenolic resin to the cyanogen halide is from about 1:1.03 to about 1:1.07, with an equivalent ratio of from about 1:1.05 being the mole ratio of choice. The above equivalent ratios are designed to provide levels of cyanation of greater than about 80 mole percent with the uncyanated sites being —OH, preferably with substantially 100% cyanation. Equivalent ratios of less than about 1:1 may be employed if a lesser degree of cyanation is desired.

Any cyanogen halide can be used in the practice of this invention. The preferred cyanogen halide is selected from the group consisting of cyanogen chloride and cyanogen bromide.

Reaction temperatures for use in the second step of the process are critical, and the second step is carried out at a temperature equal to or less than about 0° C. It is believed that reaction temperature has a significant impact on the amount of by-products such as carbamates, and dicyanamides. If the reaction is carried out at temperatures greater than 0° C. the formation of these undesirable by-products results. Reaction temperatures are preferably from about −5° C. to about −45° C., more preferably from about −5° C. to about −30° C. and most preferably from about −15° C. to about −30° C.

Reaction pressures are not critical and the reaction can be carried out at sub-atmospheric pressure, atmospheric pressure or super-atmospheric pressure. For convenience, the reaction is carried out at atmospheric pressure.

Reaction times may vary considerably and will depend upon such factors as the degree of agitating temperature, nature and proportion of reactants and the like. The reaction is carried out for a time sufficient to provide the desired amount of cyanation. In general, reaction times are from about a few minutes to about 1 or more hours to about 1 or more days.

The cyanato-group containing phenolic resin can be recovered by conventional means, preferably under substantially anhydrous conditions. Usually the reaction mixture is filtered to remove solid by-product such as the tertiary amine hydrohalide. The filtrate contains the cyanato-group containing the phenolic resin, solvent and soluble impurities. The resin can be separated from the filtrate by conventional means for removal of dissolved reaction product from a reaction mixture. The preferred technique is extraction of the cyanated resin into a solvent for the resin and a non-solvent for the impurities at room temperature. Illustrative of useful extraction solvents are solvents which are immiscible in the water immiscible, non-hydrogen bonding solvent used as the reaction medium and which are capable of solubilizing the inorganic hydrohalide salt by-product. The extraction is preferably conducted with water as the solvent for the cyanato-group containing resin at atmospheric pressure and at room temperature. Alternatively, the cyanato-group containing phenolic resin can be isolated in a mixture of water miscible and water immiscible solvents. The resin can be isolated from the water immiscible solvent.

The cyanato-group containing resins prepared by the process of this invention are of the Formula I:

FORMULA I

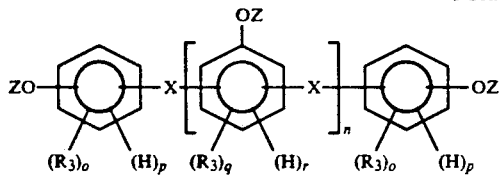

wherein $R_3$, Z, o, p, X, q, n and r are as defined above and having the preferences described above.

In general, at least about 50 mole percent of Z groups (based on the total moles of Z groups) are —CN, with the remaining groups being —OH. In the preferred embodiments of the invention, at least about 70 mole percent of Z are —CN groups (based on the total moles of Z groups), and in the particularly preferred embodiments of the invention at least about 80 mole % of the Z groups are —CN groups on the aforementioned basis. In the most preferred embodiments of the invention, at least about 80 to 95 mole % of the Z groups are —CN groups, based on the total number of Z groups, with those embodiments in which substantially about 100 mole % of the Z groups are —CN on the aforementioned basis being the embodiment of choice.

The cyanato-group containing resins prepared in accordance with the process of this invention exhibit several beneficial properties. For example, the resins of the present invention are processible using conventional plastic processing equipment and have a long shelf life. This is indicated by the gel time of greater than 1 minute, preferably greater than 2 minutes, more preferably greater than 10 minutes at 155° C. The gel time can be greater than 20 minutes at 155° C. There is substantially no smoke generation during gel time measurement at 155° C.

The phenolic triazine resins also exhibit a thermal stability of at least 400° C., and preferably at least 450° C. as measured by Thermal Gravimetric Analysis. Moreover, the phenolic triazine resin prepared by the process of the present invention has a char value at 900° C. of at least about 50% by weight, preferably from about 50 to about 70% by weight, and more preferably from about 60 to about 70% by weight.

It is believed that the improved properties attained by the cyanato group containing phenolic resin of the present invention result is at least in part, from the resin having low residual amounts of cyanamides as for example dialkyl cyanamide, such as diethyl cyanamide. There is preferably less than 5% by weight based on the total weight of the resin of dicyanamide in the resin, more preferably less than 2% by weight, and most preferably less than about 1% by weight or substantially no cyanamides. Cyanamides are believed to be formed by the reaction of the tertiary amine with the cyanogen halide. For example, according to this theory, when triethyl amine is the tertiary amine it would react with the cyanogen halide to form diethyl cyanamide. This side reaction is an undesirable waste of the reactants and results in undesirable properties and by-products which can be difficult to remove. This side reaction can be minimized by conducting the reaction to form the cyanato group containing phenolic resins at from −0° C. to −45° C. Traces of cyanamide formed during the cyanation reaction can be removed by purification, typically during precipitation in a liquid such as an aliphatic hydrocarbon such as for example, hexane. Cyanamide is an undesirable volatile material which is a harmful irritant which generates smoke, and volatiles on curing.

Preferably the cyanato group containing phenolic resin has a residual amount of phenyl cyanate of less than 2% by weight based on the total weight of the resin, preferably less than 1% by weight and most preferably less than 0.5% by weight. This is desirable since it has been found that the phenol cyanate is a volatile material that contributes to the formation of smoke, volatiles, during curing of the resin. Reduced amounts of phenyl cyanate by-product in the reaction product can be obtained by using phenolic resin containing reduced amounts of free phenol.

During the esterification of the phenolic resin, it is believed that in addition to formation of —OCN moieties, carbamate moieties may be formed by reaction of —OCN functions with active hydrogen containing materials such as $H_2O$ and $C_2H_5OH$ in the reaction mixture forming the carbamate functions —C(O)NH$_2$ or —C(OH)=NH, and —C(OC$_2$H$_3$)=NH respectively. It is believed that the mole % of carbamate functions substituted to phenyl groups of the phenolic triazine/phenolic cyanate copolymer of this invention is critical to the processibility of the copolymer.

In general, the mole % of phenyl groups substituted with carbamate functions is equal to or less than about 20 mole % based on the total moles of phenyl groups present in the phenolic cyanate resin. In the preferred embodiments of the invention, the mole % of phenyl groups substituted with carbamate functions is equal to or less than about 10 mole % based on the total moles of phenyl groups and in the particularly preferred embodiments of the invention, the mole % of phenyl groups substituted with carbamate functions is equal to or less than about 5 mole % based on the total moles of phenyl groups. In the most preferred embodiments of the invention, the mole % of phenyl groups substituted with carbamate functions is equal to or less than about 2 mole % based on the total moles of phenyl groups, with those embodiments of the invention in which substantially no phenyl groups are substituted with carbamate functions being the embodiments of choice.

The precured cyanato-group containing resin of this invention can be converted into partially cured, completely cured and incompletely cured compositions by "cyclotrimerization" of the cyano group of the cyanato-group containing phenolic resin of Formula I to varying degrees. As used herein, "completely cured" modified phenolic resins are those in which less than about 20 mole percent of the original cyano groups remain unreacted, i.e., uncyclotrimerized, as determined by the method of infrared spectrophotometry; "precured" modified phenolic resins are those in which substantially about 100 mole percent of the original cyano groups are unreacted, i.e., uncyclotrimerized, as determined by the method of infrared spectrophotometry; "partially cured" modified phenolic resins are those in which from about 40 to about 70 mole percent of the original cyano groups are unreacted, i.e., uncyclotrimerized, as determined by infrared spectrophotometry; and "incompletely cured" modified phenolic resins are those in which from about 40 to about 20 mole percent of the original cyano groups are unreacted, i.e., uncyclotrimerized, as determined by infrared spectrophotometry.

By the term "polycyclotrimerization" is meant forming a cyanurate ring system by the chain extension polymerization of three aromatic cyanate groups to form the crosslinked triazine ring system which comprises the following basic repeat unit of the Formula III:

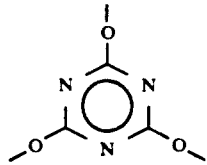

FORMULA III wherein the open valencies are bonded to a phenyl ring of a phenolic cyanate resin. The methods of conducting the polycyclotrimerization of cyanurate compounds are well known in the art, and include thermal annealing which can be conducted above about 200° C. For example, such methods are described in Kunststoffe, BD, 58, pp. 827-832 (1968) by R. Kubens et al. and Pokl AK ad Nauk SSSR, 202, pp. 347-350 (1972) by V. V. Korshak et al. and U.S. Pat. No. 4,157,360 which are hereby incorporated by reference. For example, an appropriate modified phenolic resin of the above Formula I can be crosslinked, preferably neat, with or without an acceptable catalyst at elevated temperatures.

The polymerization is induced thermally. The threshold polymerization temperature can vary widely depending on a number of factors, as for example, the presence or lack of a catalyst, the type of catalyst when used, the presence of free hydrogen groups and the like. In general, the threshold polymerization temperature is defined above. In the preferred embodiments of the invention, the polymerization temperature is from about 100° C. to about 350° C., and in the particularly preferred embodiments is from about 100° C. to about 300° C. Amongst these particularly preferred embodiments, most preferred are those embodiments in which the polymerization temperature is from about 120° C. to about 250° C. Heating can be accomplished by conventional methods known to those of skill in the art. Illustration of such methods are heating with an oil bath, vacuum, hot air annealing and compression molding.

The polymerization is preferably carried out in the presence of a catalytically effective amount of a catalyst. Useful catalysts can vary widely and include anhydrous metal salts such as stannous chloride dihydrate, cuprous bromide, cuprous cyanide, cuprous ferricyanide, zinc chloride, zinc bromide, zinc iodide, zinc naphthenate, zinc octanoate, copper acetyl-acetonate, zinc cyanide, zinc ferrocyanide, zinc acetate, silver chloride, ferrous chloride, nickel chloride, ferric chloride, cobaltous cyanide, nickel sulfate, stannic chloride, and nickel carbonate. Also useful as catalyst are proton-donating organic reducing agents such as tetrahydropyridine, hydroquinone and 4,4-bisphenol. Amounts of the catalyst when used are not critical and can vary widely provided that the amount is sufficient to catalyze the reaction to the desired extent.

Reaction pressures are not critical and can vary widely. The reaction can be carried out at subatmospheric, atmospheric or super-atmospheric pressures. However, in the preferred embodiments of the invention, the reaction is carried out at elevated pressure. In the preferred embodiments of the invention, curing pressures are about 500 psi for 5 minutes to about 1 hour depending on sample size.

Reactors suitable for use in the polymerization reaction are not critical and reactors used in conventional bulk polymerizations can be used as for example, an autoclave. Suitable reactors will usually be equipped with a temperature control means to maintain the reaction mixture within the desired temperature range, and preferably equipped with means to maintain the reactor substantially oxygen free; as for example, means for carrying out the polymerization under an inert gas such as nitrogen.

The process of this invention can be conducted in a batch, semicontinuous or continuous fashion. The reaction can be conducted in a single reaction zone or in a plurality of reaction zones, in series or in paralleled or it may be conducted intermittently or continuously in an elongated tubular zone or series of such zones. The materials of construction employed should be inert to the reactants during the reaction and the fabrication of the equipment should be able to withstand the reaction temperatures and pressure.

The reaction zone can be fitted with one or more internal and/or external heat exchanger(s) in order to control undue temperature fluctuations, or to prevent any possible "runaway" reaction temperatures or fluctuations therein. In preferred embodiments of the process, agitation means to vary the degree of mixing of the reaction mixture can be employed. Mixing by vibration, shaking, stirring, rotation, oscillation, ultrasonic vibration or the like are all illustrative of the type of agitation means contemplated. Such means are available and well known to those skilled in the art.

The reactants and reagents may be initially introduced into the reaction zone batchwise or may be continuously or intermittently introduced in such zone during the course of the process. Means to introduce and/or adjust the quantity of reactants introduced, either intermittently or continuously into the reaction zone during the course of the reaction, can be conveniently utilized in the process especially to maintain the desired molar ratio of the reaction solvent, reactants and reagents.

The phenolic cyanate polymer of this invention, and the completely cured, incompletely cured and partially-cured compositions of this invention are useful in forming a wide variety of industrial products, including shaped articles, as produced by known shaping processes. The phenolic cyanate polymer of this invention compositions can be formed (i.e., shaped) into articles which can then be cured to form completely cured, incompletely cured and partially cured articles. Shaped articles produced from the polymer composition include windscreens such as wind shields, structural foam, structural parts, fibers, canopies, films, door windows, wire housing and the like. The shaping process can be any process known to one skilled in the art, such as injection, blow or extrusion molding. Another use of the crosslinked polymer of the member is a bind agent in the manufacture of friction materials such as brake linings, clutch facings and transmission bands, as for example those described in U.S. Pat. Nos. 3,966,670, 4,268,657, or 4,281,361. Still other uses of the copolymers of this invention are molding materials, composites for use in the manufacture of structural parts. Yet other copolymers of this invention are useful as adhesives.

In order that those skilled in the art will be better able to practice the invention, the following examples are given by way of illustration and not by way of limitation. In the examples, all parts are by weight unless otherwise noted.

EXAMPLE I

A mixture of 20.4 g of finely powdered novolac (670 number average molecular weight by GPC) was placed into 125 g of methylene chloride to form a slurry. To the slurry 22.2 g of triethylamine was added gradually over a period of 20 minutes. The mixture was stirred at room temperature for 40 minutes, then at $-30°$ C. for another 40 minutes to form a clear solution of trialkyl ammonium salt of the novolac. To 125 g of methylene chloride was added 24.8 g of cyanogen bromide under a nitrogen atmosphere. The solution containing the trialkyl ammonium salt of novolac was added to the cyanogen bromide solution over a period of 30 min. During the addition, the temperature of the reaction mixture was maintained at $-15°$ C. to $-10°$ C. After the reaction was completed, the mixture was allowed to stand for 30 minutes. The product was isolated by filtration through silica gel to remove the trialkyl ammonium salt. The filtrate was purified by water extraction until the pH of medium was neutral (pH 6.5–70). The first extraction was done at low temperature ($-10°$ C.) with 3–5% sodium chloride solution. Subsequent extractions were performed at room temperature. The cyanated phenolic resin remained in the methylene chloride solution. The solution was dried over $MgSO_4$. GLC analysis shows only 0.46% of diethylcyanamide. FTIR analysis shows cyanate peak at 2230 $cm^{-1}$ and no peaks which correspond to triazine or carbamate. Gel time of the product at 150° C. is 25 minutes and no smoke was generated during gel time measurements.

EXAMPLE II

Example I was repeated except 690 gram of novolac is reacted with 716.5 grams of triethylamine in 3.5 L methylene chloride to form the corresponding ammonium salt. The salt solution was kept overnight at $-20°$ C. to $-10°$ C. A clear light yellow color trialkyl ammonium salt formed. The salt solution was added over a period of 1 hour to a solution of 812 g of cyanogen bromide in 3 L methylene chloride. The temperature of the reaction mixture was maintained $-15°$ C. to $-10°$ C. during entire addition period. After the addition was completed, the mixture was stirred for 2 hours after which it was separated in two portions. The product was isolated from the first portion by filtration through silica gel. The filtrate was purified as in Example I. The analysis of this portion shows that the diethylcyanamide level is 0.76 wt %.

The purification of the second portion was performed in the reactor. In this procedure, cold water was added to the second portion, which contained cyanated novolac and trialkyl ammonium hydrobromide salt in methylene chloride. The mixture was then washed with water several times until the pH was 6.5–7. The methylene chloride layer containing the cyanated novolac was after separated from the water layer.

EXAMPLE III

Example I was repeated except 12 gm of novolac ($\overline{M}_n$ 670), 8.24 g of trimethylamine and 100 gms of methylene chloride were used. The trialkyl ammonium salt of the novolac was maintained at $-30°$ C., prior to addition to 16.50 gm of cyanogen bromide in 65 g of methylene chloride. After purification by water extraction, GC analysis showed no evidence of dimethylcyanamide.

COMPARATIVE EXAMPLE A

Preparation of the Phenolic Cyanate of Japanese Kokai No. 149918-1984. Example 4

To a 2 liter beaker was added 384 g of novolac (550 number average molecular weight), 330.4 g of triethylamine and 768 g of methylene chloride. A highly viscous solution of the trialkyl ammonium salt of the novolac resulted. A 417.6 g sample of cyanogen bromide was added to 976 g methylene chloride in a 4 liter beaker, and the solution was cooled to 0° C. The trialkylammonium salt solution was added to the cyanogen bromide solution over a 45 min. period using an addition funnel while maintaining the temperature of the reaction exotherm at about 0° C. with a dry ice/isopropanol bath. The heterogeneous reaction mixture was then allowed to react for an additional 30 min., after which it was poured into 300 ml of deionized water with stirring. The methylene chloride layer was isolated and washed 2 times with 300 ml of deionized water. Upon concentration in a rotary evaporator, a semisolid product was obtained which upon drying under vacuum pump provide a solid product.

The analysis of the semisolid product by gas chromatograph indicated the presence of dicyanamide byproduct in amount of about 5%. IR spectrum of solid material indicated the presence of carbamate functions (about 10–15%) at 1740 $cm^{-1}$ and 3300 $cm^{-1}$.

COMPARATIVE EXAMPLE B

Preparation of the Phenolic Cyanate of Japanese Kokai No. 149918-1984 (Example 2)

To a 600 ml beaker was added 48 g of novolac (328 number average molecular weight) 47.4 g of triethylamine and 96 g of dichloromethane to form the triethyl ammonium salt. Cyanogen bromide (53.95 gm) was dissolved in 122 g of dichloromethane. The triethyl ammonium salt of novolac was added to the cyanogen bromide solution while the temperature was maintained at 0° C. The reaction was continued for 30 min. while stirring. To the reaction mixture was added 110 g of water in 3 portions to the above reaction mixture. The triethyl amine hydrochloride salt was soluble in the water phase. The phenolic resin containing the cyanic ester group was isolated under vacuum concentration on a rotary evaporation. A viscous mass resulted. Gel time of viscous mass was 7 minutes at 155° C. During gel time measurement smoke was observed and unpleasant odor was found. Diethyl cyanamide content found by GPC was about 3 wt %.

COMPARATIVE EXAMPLE C

Preparation of the Phenolic Cyanate of U.S. Pat. No. 4,022,755. Example 1

To a 2 liter beaker was added 100 g of novolac (380 number average molecular weight) and 500 ml methylketone. A yellow solution was observed in 10 minutes. The solution was cooled to 0° C., and 113 g of cyanogen bromide was added. A 99.8 g sample of triethylamine was added to the novolac-cyanogen bromide solution. The rate of addition was controlled to provide a temperature of from −5° C. to −10° C. After the triethylamine addition, a heterogeneous reaction mixture was observed. The triethyl ammonium bromide salt by-product was filtered from the reaction mixture, and the filtrate was concentrated on a rotary evaporator under reduced pressure. The product obtained was insoluble in organic solvents and a gel was observed. The IR spectrum indicate formation of carbamate at 1740 cm$^{-1}$ and 3300 cm$^{-1}$. The GC analysis of reaction filtrate indicate the presence of about 5-7% dicyanamide.

COMPARATIVE EXAMPLE D

Preparation of the Phenolic Cyanate of U.S. Pat. No. 4,022,755. Example 4

To a mixture of 108 g (0.999 mole) of m-cresol and 65 g (0.801 mole as CH$_2$O) of formalin (37% CH$_2$O) were added 0.2 g of (0.0022 mole) oxalic acid and 0.1 g (0.0010 mole as HCl) of hydrochloric acid (35%). The mixture was heated at 99° C. to 100° C. to form an emulsion. The emulsion was refluxed for 4 hours and 30 minutes, and then dehydrated under reduced pressure to obtain a solid cresol novolac. The resulting cresol novolac had a melting point of 92° C.-103° C.

In 210 ml of acetone was dissolved 72 g (0.6 mole as (—OH) of the m-cresol novolac. The resulting solution was cooled to 0° C. To the cooled solution was added 70 g (0.661 mole) of cyanogen bromide followed by dropwise addition of 64 g (0.632 mole) of triethylamine. After completion of the reaction, the triethylamine hydrobromide salt was removed. The resulting reaction mixture was added to vigorously stirred water. A semisolid product obtained which was dried 40° C. in a vacuum oven to 18 hrs. to obtain a solid powder having a melting point of 72° C.-78° C. IR spectrum revealed a strong absorption at 2250 cm$^{-1}$ which indicated formation of cyanate (about 80-85%), The spectrum also indicate 5 mole % carbamate formation and 10-15 mole % of unreacted hydroxyl groups.

A 50 g sample of the phenolic cyanate was molded in a 3"×3" mold at 155° C., 300 psi for 10 min. The materials squeeze out from the mold without forming representative sample for thermal (Tg) and mechanical measurements.

COMPARATIVE EXAMPLE E

Preparation of Phenolic Cyanate of U.S. Pat. No. 3,448,079

A 106 g sample of novolac (620 number average molecular weight) and which contains one OH group per 106 molecular weight was dissolved in 250 ml of acetone. The solution was cooled to 0° C. after which 128 g of cyanogen bromide was added. To the solution was then slowly added dropwise 145 ml of triethylamine. Cyanogen bromide (5 g) was then added to the reaction mixture during the course of the reaction to replace evaporation loses. The triethylaminehydrobromide salt produced by the reaction was removed by suction filtration, and the filtrate concentrated by evaporation to provide a solid powder. IR spectrum indicated cyanate formation and the presence of carbamate functions.

COMPARATIVE EXAMPLE F

A series of experiments were carried out for the purpose of evaluating the thermal characteristics of certain embodiments of this invention whose preparation is described in Example I and to compare same to the thermal characteristics of the materials of Comparative Examples A, B, C, D, and E and to the thermal characteristics of a base phenolic resin. The thermal characteristics were chosen for comparative purposes because these characteristics impact significantly on the use of these materials in high temperature applications. In these experiments, thermogravimetric analysis (TGA) was carried out in an argon atmosphere to determine the weight loss of a sample as a function of temperature and the % char at 1000° C. These experiments were carried out using a Dupont-1090 thermogravimeter at a heating rate of 10° C./min. The typical size sample was 30-40 mg. The results of these experiments are set forth in the following Table I.

TABLE I

| Exp. No. | Sample | % Weight Loss at °C. | | | | | | | | | % Char at 1000° C. |
|---|---|---|---|---|---|---|---|---|---|---|---|
| | | 200° C. | 300° C. | 400° C. | 450° C. | 500° C. | 600° C. | 700° C. | 800° C. | 900° C. | |
| (1) | Ex 1 | 0 | 0 | 0 | 2.08 | 13.29 | 23.03 | 30 | 34 | 35 | 67.95 |
| (2) | Ex A | 13 | 14 | 15 | 20 | 26 | 34 | 40 | 42 | 43 | 55 |
| (3) | Ex B | 2.74 | 6.42 | 16.57 | 32 | 39.07 | 46.68 | 50.64 | 52.64 | 53.44 | 45.66 |
| (4) | Ex C | 15 | 16 | 17 | 18 | 24 | 35 | 38 | 42 | 41 | 56 |
| (5) | Ex D | 15 | 15.5 | 16 | 34 | 38 | 46 | 48 | 51 | 53 | 46 |

TABLE I-continued

| Exp. No. | Sample | % Weight Loss at °C. | | | | | | | | | % Char at 1000° C. |
| --- | --- | --- | --- | --- | --- | --- | --- | --- | --- | --- | --- |
| | | 200° C. | 300° C. | 400° C. | 450° C. | 500° C. | 600° C. | 700° C. | 800° C. | 900° C. | |
| (6) | Ex E | 3.5 | 4.5 | 10 | 20 | 30 | 39 | 46 | 48 | 47 | 53 |

COMPARATIVE EXAMPLE G

Example 1 of U.S. Pat. No. 3,448,079, Examples 1, 3 and 4 of U.S. Pat. No. 4,022,755 and Examples 2 and 4 of Japanese Kokai 149918 were repeated and the gel time, weight % of diethyl cyanamide and smoke generation during gel time measurements were evaluated.

Measurements were made to determine the gel time of materials of these patents and of the cyanato containing phenolic resins produced by Example I of the present invention. The samples were tested for gel time using the following procedure:

Apparatus

Stop watch
0°–250° C. thermometer
Electric hot plate, adjusted to 155 1° C. and enclosed in a wind shield.
4" spatula

Method

1. For powdered resins: Weigh out a 1.0 gram sample on a watch glass.
2. Quickly dump the complete sample on the center surface of the hot plate and at the same time start the stop watch.
3. Using a 4" spatula spread the resin over a 2" square area in the center of the hot plate and stroke the entire area with the spatula at a rate approximating 80 strokes per minute. Without stopping the watch, note the time it took for the resin to melt.
4. Continue stroking, keeping the blade of the spatula close to the surface of the resin, until the resin has passed through a stringy stage and suddenly seems hard and glazed and offer little or no resistance to stroking with the spatula. This end point is best determined only after considerable practice to get the "feel" of the resin as it "lets go" at its gel point.
5. Record number of seconds to melt and number of seconds for gel time (cure time). Subsequent checks on the same sample should agree within 5 seconds.

Smoke generation was a visual observation during testing of gel time. The percent diethyl cyanamide was measured by Gel Permeation Chromatography (GC). The results are summarized in Table II in side-by-side comparison with the results of the evaluation of the same properties for the composition of Example 1:

TABLE II

| Composition | Gel time (min) | Smoke | Diethyl Cyanamide wt % by GC |
| --- | --- | --- | --- |
| Ex. 1 | 25 | no smoke | 0.47 |
| U.S. Pat. No. 3,448,079 (Ex. 1) | Instant- no clear melting point | Smoke | 8 |
| U.S. Pat. No. 4,022,755 (Ex. 1) | 8 min. | Heavy Smoke | 5–7 |
| U.S. Pat. No. 4,022,755 (Ex. 3) | 5.5–6 min. | Mild Smoke | 4.25 |
| U.S. Pat. No. 4,022,755 (Ex. 4) | 15 min. | Heavy Smoke | — |
| Japanese Kokai 149918 (Ex. 4) | — | — | 5 |
| Japanese Kokai 149918 (Ex. 2) | 7 min. | smoke | 3 |

What is claimed is:

1. A process for preparing a cyanato group containing phenolic resin of the formula:

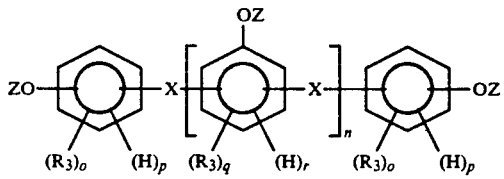

which comprises the steps of:
(a) reacting a tertiary amine with a phenolic resin of the formula:

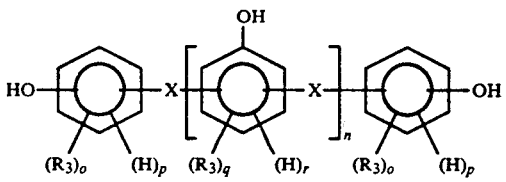

in a reaction medium comprising one or more halogenated alkane solvents having a solubility parameter equal to or greater than about 9 at a temperature equal to or less than about 25° C. to form the ammonium salt of said phenolic resin; and
(b) reacting said ammonium salt with a cyanogen halide in a reaction medium comprising said solvent at temperature equal to or less than about 0° C. to form a reaction product comprising said cyanato group containing phenolic resin and an ammonium hydrohalide salt by-product;
wherein:
n is a positive whole number greater than or equal to 1;
q and r are the same or different at each occurrence and are whole numbers from 0 to 3, with the proviso that the sum of q and r at each occurrence is equal to 3;
Z is —CN, or hydrogen and —CN;
o and p are the same or different at each occurrence and are whole numbers from 0 to 4, with the proviso that the sum of o and p at each occurrence is equal to 4;

—X— is the same or different at each occurrence and is methylene, methylene substituted with alkyl having 1 to about 10 carbon atoms, halo or furfuryl or —X— is a moiety selected from the group consisting of;

$-O-$, $-S-$, $-SO_2-$, $-C(O)-$, $-OC(O)$, $-C(O)O$ or

$R_3$ is the same or different at each occurrence and is a substituent other than hydrogen which is unreactive under conditions necessary to completely cure the copolymer.

2. The process of claim 1 wherein from about 20 to about 100 mole percent of —Z are —CN.

3. The process of claim 2 wherein from about 80 to about 100 mole percent of —Z are —CN.

4. The process of claim 3 wherein about 100 mole percent of —Z are —CN.

5. The process of claim 4 wherein —X— is methylene or 1,4-phenyldimethylene.

6. The process of claim 5 wherein —X— is methylene.

7. The process of claim 6 wherein n is from 1 to about 10.

8. The process of claim 7 wherein:
o is 0 or 2;
p is 2 to 4;
q is 0, 1 or 2;
r is 2 to 3; and
$R_3$ is alkyl.

9. The process of claim 8 wherein $R_3$ is alkyl from 1 to about 4 carbon atoms.

10. The process of claim 8 wherein:
o and q are 0;
p is 4; and
q is 3.

11. The process of claim 10 wherein said cyanato group containing phenolic resin has a gel time of greater than about 10 minute at 155° C., with no or substantially no smoke generation during gel time measurements.

12. The process of claim 11 wherein said gel time is greater than about 20 minutes at 155° C.

13. The process of claim 10 wherein said cyanato group containing phenolic resin has a concentration of cyanamide of less than about 1% by weight of the resin.

14. The process of claim 10 wherein said cyanato group containing resin can be cyclotrimerized to form a fully cured phenolic triazine resin having a thermal stability of at least about 400° C. and a char value at 900° C. of at least about 50% by weight of the phenolic triazine resin as measured by Thermal Gravimetric Analysis.

15. The process of claim 14 wherein said thermal stability is at least about 450° C. and said char value is from about 60 to about 70% by weight.

16. The process of claim 10 wherein said cyanato group containing resins has a concentration of phenolic cyanate equal to or less than about 1% by weight of said resin.

17. The process of claim 10 wherein said tertiary amine is a trialkylamine.

18. The process of claim 17 wherein said cyanato group containing phenolic resin has:
(i) a gel time greater than about 10 minutes at 155° C. wherein no or substantially no volatiles are generated during gel time measurements; and
(ii) a dialkyl cyanamide and a phenyl cyanate concentration equal to or less than about 1% by weight of said resin; said cyanato group containing phenolic resin capable of being cyclotrimerized to form a fully cured phenolic triazine having a thermal stability of at least about 400° C. and a char value at 900° C. of at least by 50% by weight of the phenolic triazine as measured by Thermal Gravimetric Analysis.

19. The process of claim 18 wherein phenolic resin has a number average molecular weight of from 320 to 1700.

20. The process of claim 19 wherein the step of reacting the trialkylammonium salt with the cyanogen halide is carried out at a temperature equal to or less than about $-5°$ C.

21. The process of claim 20 comprising reacting the trialkylammonium salt with the cyanogen halide is carried out at a temperature from about $-5°$ C. to $-45°$ C.

22. The process of claim 21 comprising reacting the trialkylammonium salt with cyanogen halide is carried out at a temperature from about $-15°$ C. to $-30°$.

23. The process of claim 20 wherein the trialkylamine is triethyl amine.

24. The process of claim 20 wherein said solvent is selected from the group consisting of chloroalkanes.

25. The process of claim 24 wherein said solvent is methylene chloride.

26. The process of claim 24 which further comprises the step of:
purifying said reaction product by extraction with an extractive solvent which is a non-solvent for said cyanato group containing phenolic resin, which is a solvent for said ammonium hydrohalide salt by product and which is non-solvent for said halogenated alkane.

27. The process of claim 26 wherein said extractive solvent is water.

28. The process of claim 27 wherein said phenolic cyanate resin:
(i) has a gel time of at least about 20 minutes at 155° C. and emits no or substantially no volatiles during gel time measurements; and
(ii) forms a phenolic triazine on curing which exhibits no or substantially no weight loss on heating a 30 to 40 mg sample of the triazine from room temperature to about 450° C. at a rate of 10° C./min under argon, and which on further heating to 900° C. has a char yield of from about 60 to about 70% by weight of the triazine.

* * * * *